(12) United States Patent
Joppeck et al.

(10) Patent No.: US 7,874,416 B2
(45) Date of Patent: Jan. 25, 2011

(54) SELF-ALIGNING DETENT SPRING ASSEMBLY

(75) Inventors: Dwayne P. Joppeck, Saline, MI (US); Kevin A. Shipley, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 802 days.

(21) Appl. No.: 11/780,634

(22) Filed: Jul. 20, 2007

(65) Prior Publication Data

US 2009/0020355 A1 Jan. 22, 2009

(51) Int. Cl.
*G05G 5/08* (2006.01)
(52) U.S. Cl. ................... 192/219.5; 74/337.5; 74/443
(58) Field of Classification Search ................. None
See application file for complete search history.

(56) References Cited

U.S. PATENT DOCUMENTS 7,574,938 B2 * 8/2009 Andrews et al. ......... 74/473.12
7,654,168 B2 * 2/2010 O'Brien et al. .......... 74/473.25

* cited by examiner

*Primary Examiner*—David D Le
*Assistant Examiner*—Ryan Dodd
(74) *Attorney, Agent, or Firm*—Quinn Law Group, PLLC

(57) ABSTRACT

An automatic transmission has a park system with a shaft and a parking pawl. The shaft rotates in response to a gear shift lever, and a detent lever positions the parking pawl in response to rotation of the shaft. A detent spring assembly biases the detent lever and has a detent spring, cage, and roller assembly. The cage aligns the roller assembly, while the detent spring is connected to the cage at one end and has a flat reaction surface formed at a second end. A cage notch portion aligns the cage with the detent lever, and the roller assembly into a perpendicular orientation with detent lever teeth. The notch portion engages either a detent tooth or a stationary portion of an internal mode switch (IMS). A shaft inserts into a roller through a side hole in the cage to retain the roller assembly therewithin.

17 Claims, 3 Drawing Sheets

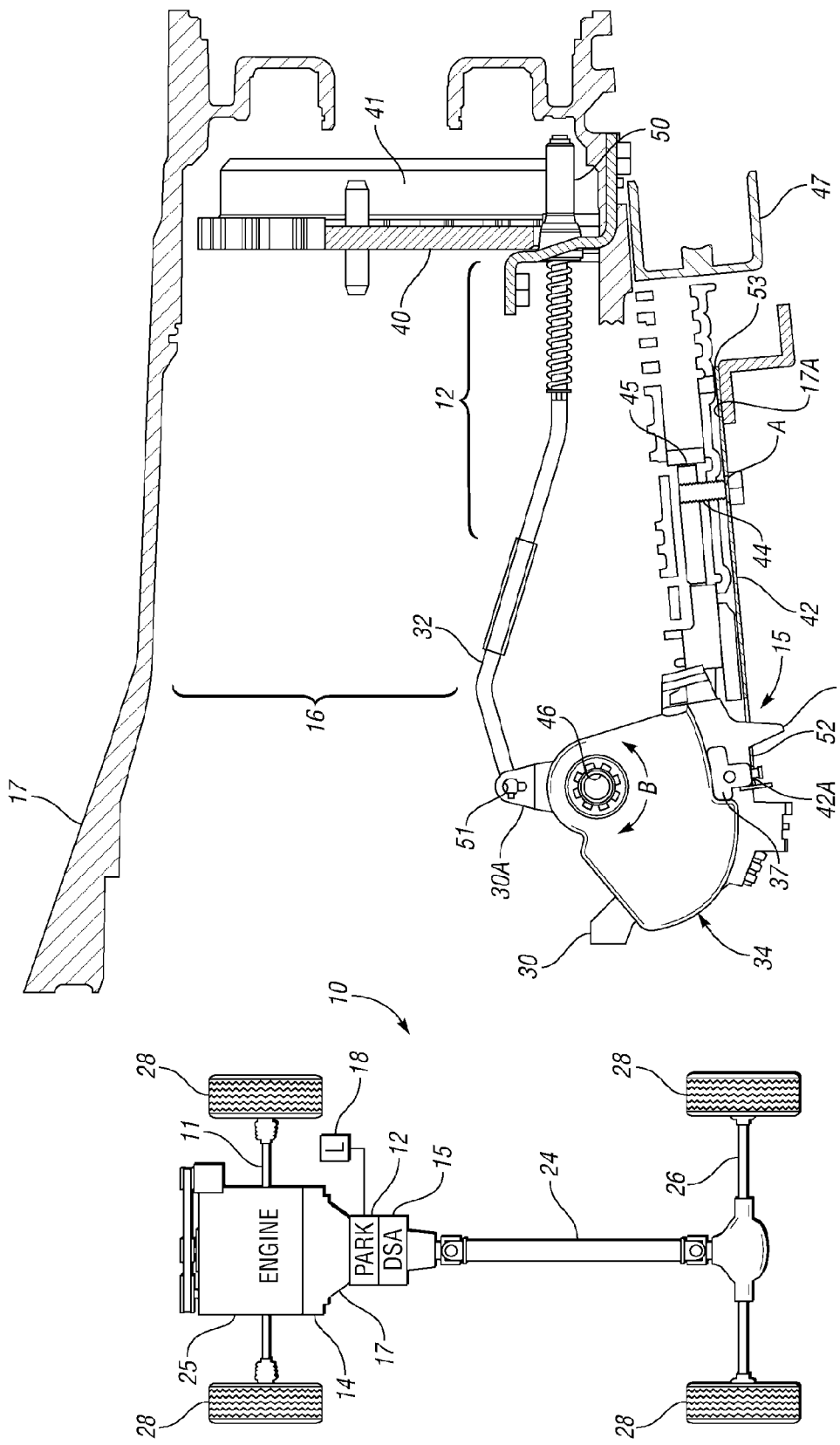

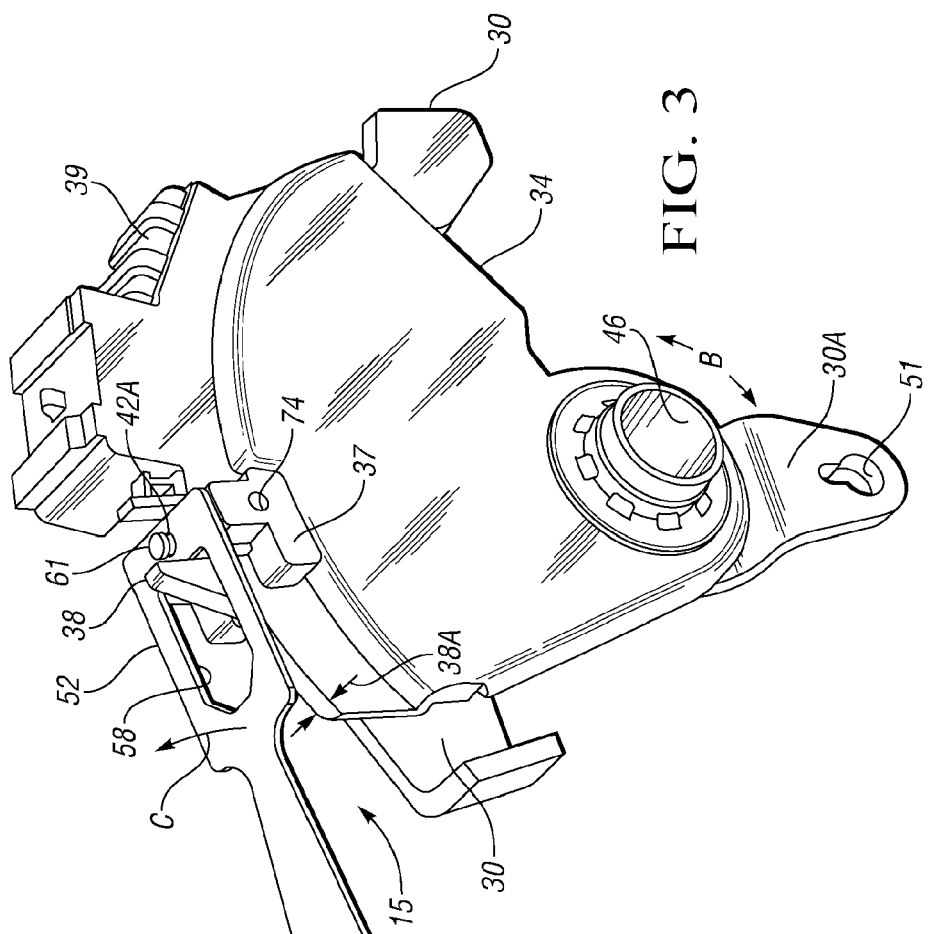
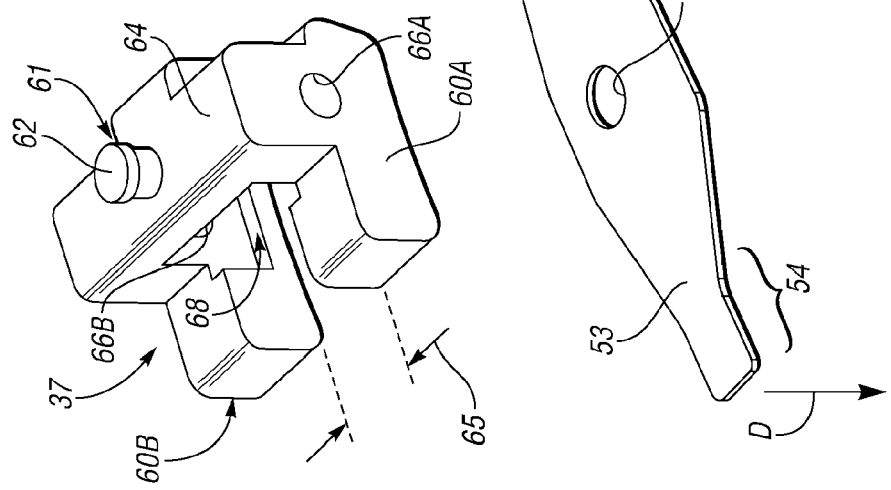

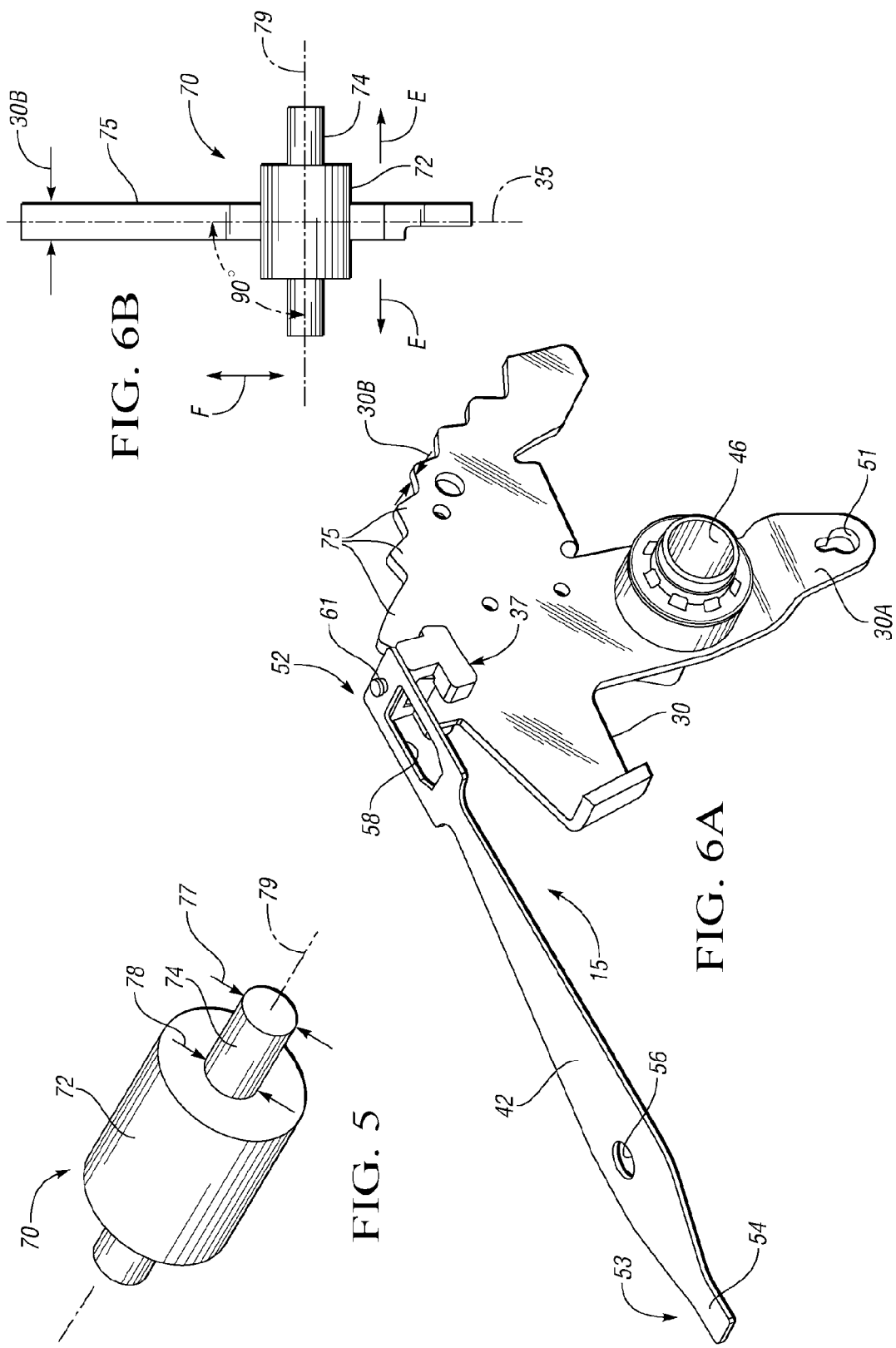

SELF-ALIGNING DETENT SPRING ASSEMBLY

TECHNICAL FIELD

The present invention relates to a self-aligning detent spring assembly for reducing the relative positional variance between a detent roller and a mating detent lever of a compact park system assembly for use within an automatic vehicle transmission.

BACKGROUND OF THE INVENTION

Conventional automatic transmissions employ an assembly commonly referred to as a "park system", which is designed to perform a variety of park-related functions for the automatic transmission. For example, park system functionality may include positive gear shift selection, manual valve positioning, and/or park pawl activation or setting for locking the automatic transmission into a "park" position or parking gear setting. While vehicles are also provided with a separate parking brake preferable for use in locking a vehicle into a park setting on a relatively steep incline, when parking a vehicle on minimal slopes or relatively flat terrain, the parking pawl of a park system generally provides sufficient parking gear retention capability.

In addition to the parking gear, park pawl, and various related valve bodies, manual valves, and/or actuators used to set or position the park pawl, a park system typically includes a rotatable detent lever having a plurality of detent teeth. The detent lever moves in response to rotation of a manual shaft which is connected to the detent lever, with the detent teeth moving an actuator via an interconnected linkage or actuator rod to thereby set the park pawl. To properly position and/or bias the detent lever, a detent spring may be employed, with the detent spring being connected to a roller on one end. The roller in turn rolls along in contact with the contours or side surfaces of the various detent teeth of the detent lever in response to rotation and/or vertical motion of the detent lever, with the detent spring in turn flexing or deflecting as needed to properly bias the roller with respect to the detent teeth.

Typically, a park system is located or positioned to the exterior of the transmission case. However, such a configuration having a conventional detent spring as described above may be less than optimal for certain purposes and in certain positional respects. For example, tolerance or space allocation issues resulting from use of a conventional detent spring may result in interference within the crowded confines of a modern transmission case or housing, such as between the detent spring and a transmission oil pan or fluid reservoir. Such tolerance concerns may render assembly within the transmission housing particularly challenging, and may lead to unwanted contact between the detent spring and the oil pan during normal vehicle operation. Additionally, conventional detent spring configurations and attachment methods may not optimize the alignment or minimize the positional variance of the detent roller and the various detent teeth of the detent lever.

SUMMARY OF THE INVENTION

Accordingly, a vehicle is provided having a transmission with a stationary housing and a parking pawl for locking the transmission into a parking gear. A manual shaft is rotatable in response to movement of a gear shift lever. A detent lever moves an actuator rod to set the parking pawl, thus locking the parking gear in response to rotation of the manual shaft, with the detent lever having a plurality of detent teeth. A detent spring assembly biases the detent lever, with the detent spring assembly having a spring portion with a first and second end, a cage portion connected to the spring portion at the first end, and a roller assembly. The cage portion retains the roller assembly therewithin and orients an axis of rotation of the roller assembly perpendicularly with respect to one of the detent teeth.

In one aspect of the invention, the cage portion has a pair of opposing side walls defining a notch portion therebetween for receiving a thickness of one of the detent teeth to align the cage portion with one of the detent teeth.

In another aspect of the invention, the vehicle has an internal mode switch (IMS), and the notch portion is configured for receiving a stationary portion of the IMS to align the cage portion with the stationary portion.

In another aspect of the invention, the spring portion has a flat spring surface at a second end, the flat spring surface resting on a surface of the stationary housing.

In another aspect of the invention, the cage portion has a deformable post that is insertable through a hole in the spring portion and deformable thereafter to thereby connect the spring portion to the cage portion.

In another aspect of the invention, the roller assembly includes a shaft portion coaxially aligned within a separate roller portion, with the shaft portion being insertable into the separate roller portion through a side hole formed in each of a pair of opposing side walls of the roller assembly cage to thereby retain the roller assembly within the cage portion.

In another aspect of the invention, an automatic transmission is provided having a stationary housing with a flat surface portion, an actuator rod connected to a parking pawl for setting of the parking pawl, and a rotatable detent lever connected to the actuator rod and having a plurality of detent teeth. The automatic transmission also includes an internal mode switch (IMS) having a stationary portion, and a detent spring assembly having a substantially flat, one-piece detent spring, a cage operatively connected to a first end of the detent spring, and a roller assembly positionable within the cage. The roller assembly is configured for rolling contact with one of the detent teeth in response to rotation of the detent lever, and the cage is configured to receive a thickness of the stationary portion to axially orient an axis of rotation of the roller assembly into an approximately perpendicular orientation with respect to a detent tooth.

In another aspect of the invention, a detent spring assembly is provided for biasing a rotatable detent lever of a park system for an automatic transmission. The detent spring assembly includes a detent spring, a roller assembly having coaxial shaft and roller portions, and a cage configured for retaining the roller assembly therein. The roller portion rolls in continuous contact with a surface of one of the detent teeth in response to rotation of the detent lever, and a first end of the detent spring is connected to the cage and is moveable upon rotation of the detent lever. The detent spring has a flat second end that rests on a flat stationary transmission surface to thereby act as a reaction end for opposing the motion of the first end, and the cage perpendicularly orients an axis of rotation of the roller assembly with a longitudinal center plane of one of the detent teeth.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a vehicle having an automatic transmission and a detent spring assembly according to the invention;

FIG. 2 is a schematic side view of a park system having a detent spring assembly according to the invention;

FIG. 3 is a perspective illustration of the detent spring assembly shown in FIG. 2;

FIG. 4 is a schematic perspective illustration of a roller assembly cage of the detent spring assembly shown in FIG. 2;

FIG. 5 is a schematic perspective illustration of a detent roller assembly for the detent spring assembly shown in FIG. 2;

FIG. 6a is a schematic perspective illustration of the detent spring assembly shown in FIG. 2 without an internal mode switch (IMS); and FIG. 6b is a schematic perspective view of the detent roller assembly of FIG. 4 positioned along the contours of a detent tooth of the detent lever shown in FIG. 6a.

DESCRIPTION OF THE PREFERRED EMBODIMENTS

Referring to the drawings wherein like reference numbers correspond to like or similar components throughout the several figures, there is shown in FIG. 1 a vehicle 10 having an engine 25, an automatic transmission 14, and a gear shift device 18, such as a gear shift lever, also labeled "L" in FIG. 1. Engine 25 may be any gasoline, diesel, and/or alternative fuel-consuming internal combustion engine, and/or a fuel cell, hybrid, or purely electric power source capable of propelling vehicle 10. Vehicle 10 includes a plurality of wheels 28, with at least one wheel 28 positioned on opposing sides on a front shaft or axle 11 and a rear shaft or axle 26. Transmission 14 is in driving connection with front and/or rear axles 11 and 26, respectively, through a rotatable transmission output shaft 24, which delivers rotational force or torque from transmission 14 to either or both of the front and/or rear axles 11 and 26, respectively, depending on whether vehicle 10 is provided with front, rear, four-wheel, or all-wheel drive capability.

Transmission 14 has a stationary outer casing or housing 17, such as a cast ferrous or non-ferrous metal housing, and contains a park system 12 therewithin, and abbreviated "PARK" in FIG. 1. Park system 12 includes a detent spring assembly 15, abbreviated "DSA" in FIG. 1, which is adapted to bias, align, and/or otherwise position a rotatable detent lever 30, which will be described later hereinbelow with reference to FIG. 2. As will be understood by those of ordinary skill in the art, park system 12 is a device operable for performing a variety of functions within transmission 14, such as gear shift selection, manual valve positioning, and/or setting or positioning of a park pawl 40, with park system 12 also described hereinbelow with reference to FIG. 2.

Turning to FIG. 2, park system 12 is shown in greater detail, with park system 12 positioned within a cavity 16 defined by housing 17. Within park system 12, an internal mode switch 34, abbreviated IMS 34 hereinafter for simplicity, is preferably operatively connected to detent lever 30, which in turn is operatively connected to an actuator linkage or rod 32. IMS 34 is an electrically actuated device known in the art of automatic transmissions to detect and/or measure the relative or differential motion and/or position of detent lever 30 with respect to a stationary portion 38 of IMS 34.

With the exception of stationary portion 38, which as shown in FIG. 2 is an indexing tooth that remains stationary to provide a reference point for measuring the relative position of detent lever 30, IMS 34 is rigidly and directly connected to detent lever 30 so as to rotate in conjunction therewith. The detected differential motion and/or relative position is detected electronically by IMS 34 in order to inform transmission 14, or more precisely to inform an integrated transmission controller (not shown) of transmission 14, of the particular gear position of a parking gear selector device 18 (see FIG. 1).

Although modern automatic transmissions such as exemplified by transmission 14 typically include an IMS 34, and therefore inclusion of IMS 34 is preferred, an IMS 34 is not itself required within the scope of the invention. However, as will be described hereinbelow, inclusion of IMS 34 in transmission 14 may provide an enhanced or an additional positioning capability to detent spring assembly 15, in addition to the obvious functional benefits as described hereinabove.

Park system 12 includes a valve body assembly 47 adapted to transfer a supply of pressurized fluid (not shown) to, for example, allow for the application and release of one or more clutch packs, bands, and/or hydraulic accumulators (not shown) to allow automatic shifting of transmission 14 (see FIG. 1). Additionally, one or more manual valve bodies or manual valves 45 are positioned within valve body assembly 47 to translate the mechanical setting or position of transmission 14, i.e. park, reverse, neutral, and various drive gears, into a hydraulic signal. Valve body assembly 47, being stationary or fixed within housing 17, may therefore be used to provide a convenient flex point A for detent spring 42, as described hereinbelow.

Detent lever 30 includes a detent lever portion 30A having a bolt hole 51 (also see FIG. 6A), with bolt hole 51 being sufficiently sized and positioned to provide an optimal connection point for attachment of actuator rod 32. Detent lever 30 is rigidly and directly connected to a manual shaft 46, which passes through IMS 34 when IMS 34 is included in park system 12 as shown in FIG. 2. Thus, rotation of manual shaft 46 in response to actuation of gear shifting lever 18 (see FIG. 1) or other similar device in turn drives or rotates detent lever 30, which moves actuator rod 32 as needed to thereby actuate an actuator device 50. Actuator device 50 is operable, for example, for selecting a parking gear 41 and/or for positioning or setting parking pawl 40 to lock transmission 14 (see FIG. 1) in parking gear 41, and/or to maintain a park setting on a slope or grade. If vehicle 10 (see FIG. 1) is moving when gear shifting device 18 (see FIG. 1) is positioned in a park setting, actuator 50 is also preferably operable for allowing park pawl 40 (see FIG. 2) to ratchet freely until vehicle 10 (see FIG. 1) slows below a predetermined speed, and to subsequently re-position parking gear 41.

Still referring to FIG. 2, detent spring assembly 15 of the invention is shown in an un-flexed or neutral bending position along its longitudinal axis. Detent spring assembly 15, which includes a detent spring portion or detent spring 42 and a roller assembly 70 (also see FIG. 5) which will each be described in greater detail with reference to FIG. 3 below, is in continuous rolling contact at a first end 52 with a side surface, contour, or thickness 30B of a detent tooth 75 (see FIG. 6A) of detent lever 30 to positively position or bias detent lever 30. Detent teeth 75 of detent lever 30 are hidden from view behind IMS 34, but as stated above, are shown in FIG. 6A.

Detent spring assembly 15 is rigidly connected to a stationary surface, such as manual valve 45, using a fastener 44, for example a threaded bolt, rivet, or other suitable fastening device. The junction, boundary, or interface between fastener 44 and detent spring 42 therefore forms a stationary flex point A about which detent spring 42 may flex or bend as needed in response to rotation and/or vertical motion of detent lever 30 as it moves in response to manual shaft 46. Finally, a second end 53 of detent spring 42 is configured to rest freely on a flat portion 17A of housing 17, and slides, moves or pivots as needed thereon, thus forming a reaction end sufficient for opposing motion or deflection of first end 52.

Turning to FIG. 3, detent spring assembly 15 is shown engaged with detent lever 30. IMS 34 is operatively connected to detent lever 30 of park system 12 (see FIG. 2) and has an electrical connector 39 in communication with a source of power, such as a battery (not shown), and with a transmission controller (not shown) to provide the functionality described hereinabove. Detent spring 42 is preferably a substantially flat, one-piece flexible metal spring having sufficient tensile strength to bias or exert a sufficient spring force on detent lever 30, as represented by arrow C. The spring force (arrow C) maintains a detent position to retain a gear shift position that is variably selectable by an operator of vehicle 10, i.e. by positioning a gear shifting device 18 (see FIG. 1), while still allowing relative motion to occur between various detent positions, as determined by a plurality of detent teeth 75 (see FIG. 6A) formed on detent lever 30.

Stationary flex point A (see FIG. 2) of detent spring 42 is established using fastener 44 (see FIG. 2), as described hereinabove, which is inserted into a mating bolt hole 56 formed or bored into detent spring 42, with bolt hole 56 being sufficiently sized to allow rotation as needed of detent spring 42 about flex point A (see FIG. 2) to properly compensate for any spring force (arrow C) and/or any lateral motion of first end 52, as represented by arrows E in FIG. 6B and explained hereinbelow. Finally, second end 53 of detent spring 42 is formed or otherwise provided with a substantially flat reaction surface 54, i.e. a flat end sufficiently shaped to provide a reaction force (arrow D) sufficient for opposing a spring force (arrow C) applied at first end 52 to deflect first end 52. Spring force (arrow C) may result from rotational, lateral, and/or vertical movement (arrow F of FIG. 6B) of detent lever 30. Reaction surface 54 of second end 53 is therefore adapted to freely move or slide in a rotational manner, as needed, about bolt hole 56.

First end 52 of detent spring 42 may include a hole or main opening 58 configured or shaped to receive stationary portion 38 of IMS 34, such as an indexing tooth as shown, when used with an IMS device. First end 52 is operatively connected directly to a roller assembly cage 37, preferably via a post 61 protruding through an opening or hole 42A formed in first end 52 of detent spring 42. Roller assembly cage 37 (see also FIG. 4) is configured to axially orient, align, and/or position roller assembly 70 (see FIG. 5), as will be described immediately hereinbelow, with respect to detent lever 30, or more specifically with respect to a plane 35 (see FIG. 6B) of one of the plurality of detent teeth 75 (see FIG. 6A) of detent lever 30.

Turning to FIG. 4, roller assembly cage 37 is shown including a pair of opposing side walls 60A and 60B defining a gap or notch 65 therebetween. Roller assembly cage 37, referred to hereinafter for simplicity as cage 37, may be constructed of any lightweight material having substantially rigid and moldable qualities, such as a heat resistant molded plastic. Cage 37 includes an upper or top surface 64, to which is molded or otherwise attached a post 61. Post 61 is sized and shaped to pass through a hole 42A (see FIG. 3) in detent spring 42, and deformable post portion 62 is thereafter preferably at least a partially deformed, flattened, and/or sufficiently widened sufficiently to secure, attached, or otherwise connect detent spring 42 to cage 37. To engage cage 37 with detent lever 30 and secure cage 37 thereto, cage 37 is provided with a side hole 66A, 66B passing through each of opposing side walls 60A and 60B, respectively. Opposing side walls 60A, 60B and top surface 64 form cage 37 as shown having a cavity 68 configured for receiving and retaining roller assembly 70 therewithin, with roller assembly 70 shown in FIG. 5.

Turning to FIG. 5, roller assembly 70 is shown having a preferably cylindrical roller pin 74 and a preferably separate roller 72. Roller pin 74 has a diameter 77, and roller 72 has a diameter 78, with diameter 77 of roller pin 74 being configured for press-fitting into diameter 78 of roller 72. In other words, respective diameters 77 and 78 are selected to provide an interference fit sufficient for ensuring that roller assembly 70 rotates in unison about its axis of rotation 79 within cage 37 (see FIG. 4).

Roller 72 is preferably constructed of hardened metal or other wear-resistant material, and is sized and shaped to snap-fit loosely into cavity 68 (see FIG. 4) of cage 37. The term "loosely" herein refers to a sufficient amount of tolerance within cavity 68 such that roller 72 may be manually positioned to receive roller pin 74, which is insertable into diameter 78 of cage 37 through either side hole 66A, 66B (see FIG. 4). Once so inserted, roller assembly 70 is free to rotate within cavity 68 of cage 37 about axis of rotation 79 as needed to thereby compensate for movement of detent lever 30 (see FIG. 3).

Turning briefly back to FIG. 3, detent lever 30 is shown having an optional IMS 34, as described hereinabove. When used with such an IMS 34, a thickness 38A of stationary portion 38, shown here as an indexing tooth, may be used to laterally align or orient cage 37 with detent lever 30, to which IMS 34 is operatively connected. In such an embodiment, for example, thickness 38A of stationary portion 38 is preferably selected to fit within and be received by notch 65 (see FIG. 4) of cage 37 with minimal tolerance, i.e. a sufficient amount of tolerance to allow such insertion while providing sufficient lateral positioning of cage 37. Stationary portion 38 may also be insertable through main opening 58, as shown in FIG. 3, to further locate first end 52 of detent spring 42 with respect to stationary portion 38.

Turning to FIG. 6A, another embodiment is shown in which IMS 34 (see FIG. 3) is removed, and with detent lever 30 and its plurality of detent teeth 75 remaining. In such an embodiment, a thickness 30B (also see FIG. 6B) of a detent tooth 75 of detent lever 30 may be used to laterally align cage 37 with respect to detent lever 30. In such an alternate embodiment, thickness 30B is preferably selected to fit within or be received by notch 65 (see FIG. 4) of cage 37, thereby laterally aligning cage 37 with respect to detent lever 30, or more precisely, to a thickness 30B (see FIG. 6B) of a detent tooth 75.

Finally, turning to FIG. 6B, roller assembly 70 is shown with cage 37 removed for clarity in order to describe the desired orientation or alignment of roller assembly 70 with respect to a detent tooth 75 of detent lever 30 (see FIG. 6A). Axis of rotation 79 of roller assembly 70 is shown aligned or oriented at approximately 90 degrees, i.e. perpendicularly, with respect to detent tooth 75, or more precisely with respect to a longitudinal central plane 35 of each detent tooth 75 of detent lever 30 (see FIG. 6A). Arrows E represent lateral motion of roller assembly 70 with respect to plane 35. Arrow F represents vertical motion of roller assembly 70 along thickness 30B of gear tooth 75 during rotation of detent lever 30 (see FIG. 6A). Properly aligned by cage 37 (see FIG. 4), roller assembly 70 is shown in the desired center position, i.e. with approximately half of roller assembly 70 being positioned on either side of plane 35. In this manner, cage 37 (see FIG. 4) properly orients roller assembly 70 in a perpendicular manner with respect to detent teeth 75 of detent lever 30, thereby minimizing or eliminating side-to-side or lateral positional variation of roller assembly 70.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a gear shift lever;
a transmission having a stationary housing and a parking pawl for locking said transmission into a parking gear;
a manual shaft that is rotatable in response to movement of said gear shift lever;
a detent lever assembly including a detent lever operatively connected to said manual shaft and to an actuator rod, said detent lever being configured for moving said actuator rod to set said parking pawl in response to rotation of said manual shaft, wherein said detent lever has a plurality of detent teeth; and
a detent spring assembly adapted to bias said detent lever, said detent spring assembly having:
  a spring portion with a first and a second end, wherein said first end defines a main opening which receives a stationary member of the detent lever assembly, and said second end which opposes a spring force applied to the first end;
  a roller assembly having a roller disposed on a cylindrical rolling pin; and
  a substantially rigid cage portion which is operatively connected to said spring portion at said first end, and which is positioned between said spring portion and said detent lever, the cage portion having a post which extends through said hole in said first end to secure said first end to said cage portion, and further having a pair of side walls each defining a different side hole;
wherein said cage portion receives different ends of the cylindrical rolling pin within a respective one of the different side holes to thereby retain said roller assembly between said side walls, and receives the stationary member in a notch between the side walls, to thereby orient an axis of rotation of said roller assembly perpendicularly with respect to one of said plurality of detent teeth.

2. The vehicle of claim 1, wherein said notch receiving receives a thickness of one of said plurality of detent teeth as said stationary member to thereby align said cage portion with said one of said plurality of detent teeth.

3. The vehicle of claim 1, wherein said detent lever assembly includes an internal mode switch operatively connected to said detent lever and having an indexing tooth as said stationary member, and wherein said notch portion receives a thickness of said indexing tooth to thereby align said cage portion with said indexing tooth.

4. The vehicle of claim 1, wherein said spring portion has a flat spring surface at said second end, said flat spring surface resting on a surface of said stationary housing to form a slidingly moveable reaction surface of said spring portion.

5. The vehicle of claim 1, wherein said post of said cage portion has a deformable portion deformable after insertion of the post through the hole in said first end to thereby connect said spring portion to said cage portion.

6. The vehicle of claim 1, wherein said cylindrical rolling pin is insertable into said roller through one of the side holes of the side walls defined by said cage portion to thereby retain said roller assembly within said cage portion.

7. An automatic transmission comprising:
a stationary housing having a flat surface portion;
an actuator rod operatively connected to a parking pawl for setting of said parking pawl, said parking pawl being operable when set for locking the automatic transmission into a parking gear;
a rotatable detent lever operatively connected to said actuator rod and having a plurality of detent teeth;
an internal mode switch (IMS) having a stationary portion;
a detent spring assembly having a substantially flat, one-piece detent spring, a substantially rigid cage positioned between the detent spring and the detent lever and operatively connected to a first end of said detent spring, and a roller assembly positionable within said cage and having an axis of rotation, said roller assembly being configured for rolling contact with one of said detent teeth in response to rotation of said rotatable detent lever;
wherein the cage includes a post which extends through a hole defined by said first end to thereby secure said detent spring to said cage, and further includes a pair of side walls each defining a different side hole, and further defining a notch between the side walls;
wherein said cage receives different ends of a roller pin portion of the roller assembly within a respective one of the different side holes, and further receives the stationary portion of the IMS in the notch to thereby axially orient said axis of rotation into an approximately perpendicular orientation with respect to one of said plurality of detent teeth.

8. The automatic transmission of claim 7, wherein said detent spring has an opening formed at said first end for receiving said stationary portion, and has a flat reaction surface formed at a second end, said flat reaction surface being configured to rest on said flat surface portion of said stationary housing.

9. The automatic transmission of 7, wherein said post is plastically deformable to thereby retain said detent spring to said post at said first end.

10. The automatic transmission of claim 7, wherein said roller assembly has and a roller portion, and wherein roller pin portion is insertable into said roller portion through one of said side holes and retained in the notch by said shaft portion, said shaft portion being a cylindrical pin defining said different ends of the roller assembly.

11. A detent spring assembly for biasing a rotatable detent lever of a park system for use with an automatic transmission, the rotatable detent lever having a plurality of detent teeth, the detent spring assembly comprising:
a detent spring having a primary bending axis;
a roller assembly having a shaft portion and a roller portion, said roller assembly having an axis of rotation that is perpendicularly oriented with respect to a longitudinal center plane of one of said plurality of detent teeth; and
a substantially rigid cage for perpendicularly orientating the axis of rotation with respect to the longitudinal center plane, wherein the cage is positioned between the detent spring and the detent lever, and includes a pair of side walls each defining a different side hole, wherein the cage receives a stationary member of the transmission in a notch defined between the side walls and receives different ends of said roller assembly in said side holes, said roller portion being in continuous rolling contact with a thickness of one of the plurality of detent teeth in response to rotation of the rotatable detent lever;

wherein a first end of said detent spring defines a hole which receives a post of said cage, with said first end being deflectable from said primary bending axis upon rotation of the rotatable detent lever, and wherein a flat second end of said detent spring rests on a flat stationary transmission surface to thereby act as a reaction end for opposing the deflection of said first end.

12. The detent spring assembly of claim 11, wherein said different ends are ends of a shaft portion of the roller assembly, with the shaft portion being insertable into said roller portion through said side holes to allow said shaft portion and said roller portion to rotate in unison, and to retain said roller portion and said shaft portion within said cage.

13. The detent spring assembly of claim 11, wherein said post is constructed from a plastically deformable material which is configured to form a deformed post head when deformed, said deformed post head being sufficient for retaining said first end to said cage.

14. The detent spring assembly of claim 11, wherein said detent spring has a second opening formed at said first end, said second opening being configured to receive a stationary indexing tooth portion of an internal mode switch (IMS) as the stationary member.

15. The vehicle of claim 1, wherein the substantially rigid cage portion is constructed of heat resistant molded plastic.

16. The transmission of claim 7, wherein the substantially rigid cage is constructed of heat resistant molded plastic.

17. The detent spring assembly of claim 11, wherein the substantially rigid cage is constructed of heat resistant molded plastic.

* * * * *